(12) United States Patent
Anderson et al.

(10) Patent No.: US 6,194,498 B1
(45) Date of Patent: Feb. 27, 2001

(54) NON-FOGGING PLASTICIZER AND ITS USE IN RESINOUS COMPOSITIONS

(75) Inventors: Lawrence G. Anderson, Pittsburgh; Tien-Chieh Chao, Mars; Masayuki Nakajima; Umesh Chandraprasad Desai, both of Wexford, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/371,203

(22) Filed: Aug. 10, 1999

(51) Int. Cl.$^7$ ........................................ C08K 5/43
(52) U.S. Cl. ........................... 524/168; 524/169
(58) Field of Search ..................... 524/168, 169

(56) References Cited

U.S. PATENT DOCUMENTS

| | | | |
|---|---|---|---|
| 3,764,611 | 10/1973 | Freyermuth et al. | 260/326.5 |
| 3,950,289 | 4/1976 | D'Amato et al. | 260/23 |
| 4,128,525 | 12/1978 | Yeakey et al. | 260/29.1 |
| 4,133,803 | 1/1979 | Klein | 528/340 |
| 4,136,078 | 1/1979 | Doggett et al. | 260/33.2 |
| 4,548,857 | 10/1985 | Galante | 428/200 |
| 4,946,933 | 8/1990 | Speranza et al. | 528/339.3 |
| 4,960,802 | 10/1990 | DiStefano | 521/72 |
| 5,252,622 | 10/1993 | DiStefano | 521/65 |
| 5,264,467 | 11/1993 | DiStefano | 523/218 |
| 5,264,474 | 11/1993 | Schleifstein et al. | 524/169 |
| 5,652,299 | 7/1997 | Nakajima et al. | 524/589 |
| 5,821,294 | 10/1998 | Perlinski | 524/507 |
| 5,827,393 | 10/1998 | Kinzelmann et al. | 156/308.2 |

FOREIGN PATENT DOCUMENTS

| | | |
|---|---|---|
| 1813570 | 8/1969 | (DE) . |
| 1719191 | 2/1972 | (DE) . |
| 0553651 A1 | 1/1996 | (EP) . |
| 0553651 B1 | 1/1996 | (EP) . |
| 2151654 | 4/1973 | (FR) . |
| 56-049082 | 5/1981 | (JP) . |

*Primary Examiner*—Edward J. Cain
(74) *Attorney, Agent, or Firm*—Ann Marie Cannoni; Deborah M. Altman

(57) ABSTRACT

A composition of matter is provided comprising a mixture of:

(i) at least one alkyl aromatic sulfonamide containing from 6 to 40 carbon atoms total and at least six carbon atoms in the alkyl group; and (ii) at least one polyether aromatic sulfonamide different from (i) and having the following structure:

$$Q-[(OCH(R)CH(R))_y-NH-SO_2-A]_z.$$

Q is selected from the following structures:

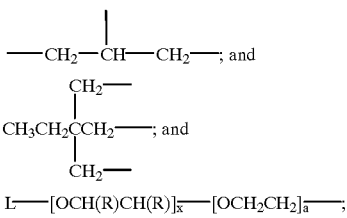

A is an aromatic group containing from 6 to 39 carbon atoms; L is an alkyl group containing from 1 to 20 carbon atoms or $A-SO_2-NHCH(CH_3)CH_2-$; R is independently hydrogen or linear or branched alkyl groups having from 1 to 4 carbon atoms; x ranges from 0 to 40; y ranges from 2 to 40; z ranges from 1 to 3; and a ranges from 0 to 40. Also provided is a resinous composition comprising a film-forming material and a plasticizer, where the plasticizer comprises (i) or the mixture of (i) and (ii) above. The resinous composition is preferably useful as a vacuum forming laminating adhesive, and is advantageous in that it is non-fogging.

17 Claims, No Drawings

NON-FOGGING PLASTICIZER AND ITS USE IN RESINOUS COMPOSITIONS

FIELD OF THE INVENTION

The present invention relates to a novel plasticizer composition and its use in resinous compositions such as film-forming compositions including adhesives, protective coatings and laminating substrates, to prevent fogging in interior automotive trim assembly parts such as instrument panels, door panels, etc.

BACKGROUND OF THE INVENTION

Plasticizers are materials added to resinous compositions to increase the deformability thereof; i.e., to make them "softer". Technically, plasticizers are diluents or solvents with low volatility, causing them to remain in the resinous composition during curing or other processing. Their presence in the composition reduces cohesive bonds among the resin molecules, allowing them to flow past each other, thereby lending a degree of deformability to the resinous composition on a macroscopic level.

EP 553651 discloses bissulfonamide plasticizers for use with thermoplastic adhesive materials. U.S. Pat. No. 5,264,474 discloses mixtures of monosulfonamides and mixtures of bissulfonamides suitable for use as plasticizers. U.S. Pat. No. 4,946,933 discloses toluenesulfonamide plasticizers used in conjunction with adhesives derived from polyoxyalkylene amines.

Typically, the adhesive compositions used in vacuum forming processes comprise a film-forming material impregnated with a plasticizer. Vacuum forming is a conventional process for adhering thermoplastic materials to contoured substrates, particularly in the automotive industry. For example, a thermoplastic material (e.g., polyvinyl chloride flexible sheeting) can be laminated onto automobile parts such as consoles, dash boards, door panels, and other interior surfaces using vacuum forming. The substrates can be any conventionally used material, such as acrylonitrile-butadiene-styrene terpolymer (ABS) or fiberboard. The process involves coating the substrate with an adhesive, heating the thermoplastic material past its softening point, draping the thermoplastic material over the substrate, and applying a vacuum through the substrate to pull the thermoplastic material onto the contours of the substrate.

Sulfonamide plasticizers that are N-substituted with lower alkyl groups tend to be volatile and may evaporate from the adhesive composition during the life of an automobile, only to recondense on adjacent substrates, particularly windshields or windows, causing fogging or an unacceptable oily residue.

It would be desirable to provide a composition suitable for use as a non-fogging plasticizer in a resinous composition such as a vacuum forming adhesive, that overcomes the drawbacks of the prior art.

SUMMARY OF THE INVENTION

In accordance with the present invention, a composition of matter is provided comprising a mixture of:

(i) at least one alkyl aromatic sulfonamide containing from 12 to 40 carbon atoms total and at least six carbon atoms in the alkyl group; and (ii) at least one polyether aromatic sulfonamide different from (i) and having the following structure:

$$Q-[(OCH(R)CH(R))_y-NH-SO_2-A]_z.$$

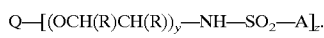

Q is selected from the following structures:

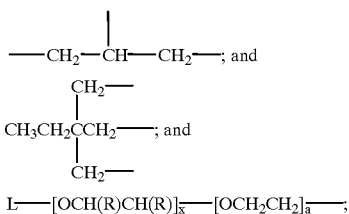

A is an aromatic group containing from 6 to 39 carbon atoms; L is an alkyl group containing from 1 to 20 carbon atoms or $$A-SO_2-NHCH(CH_3)CH_2-;$$

R is independently hydrogen or linear or branched alkyl groups having from 1 to 4 carbon atoms; x ranges from 0 to 40; y ranges from 2 to 40; z ranges from 1 to 3; and a ranges from 0 to 40. Also provided is a resinous composition comprising a film-forming material and a plasticizer, wherein the plasticizer comprises (i) or the mixture of (i) and (ii) above.

Other than in the operating examples, or where otherwise indicated, all numbers expressing quantities of ingredients, reaction conditions, and so forth used in the specification and claims are to be understood as modified in all instances by the term "about". Note further that the numerical ranges of values for subscripts in chemical structures are intended to encompass average values.

DETAILED DESCRIPTION

The composition of the present invention comprises a mixture of:

(i) at least one alkyl aromatic sulfonamide containing from 12 to 40 carbon atoms total and at least six carbon atoms in the alkyl group; and (ii) at least one polyether aromatic sulfonamide different from (i) and having the following structure:

$$Q-[(OCH(R)CH(R))_y-NH-SO_2-]_3.$$

Q is selected from the following structures:

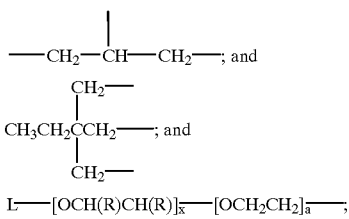

A is an aromatic group containing from 6 to 39 carbon atoms; L is an alkyl group containing from 1 to 20 carbon atoms or $$A-SO_2-NHCH(CH_3)CH_2-;$$

R is independently hydrogen or linear or branched alkyl groups having from 1 to 4 carbon atoms. The subscript x ranges from 0 to 40; y ranges from 2 to 40; z ranges from 1 to 3; and a ranges from 0 to 40.

The alkyl aromatic sulfonamide of (i) may be selected from alkyl benzene sulfonamides, alkyl toluene sulfonamides, alkyl naphthalene sulfonamides, alkyl mesitylene sulfonamides, alkyl hexadecyloxy benzene sulfonamide and the like. Mixtures of various alkyl aromatic sulfonamides having different alkyl and/or aromatic groups may also be used. Alkyl groups typically contain from 6 to 25 carbon atoms, preferably 6 to 10 carbon atoms, and may be cyclic, linear or branched. The alkyl groups may further contain alkoxy linkages. Alkyl aromatic sulfonamides containing alkyl groups having less than 6 carbon atoms tend to be volatile, and may cause fogging. Examples of suitable alkyl aromatic sulfonamides include N-hexyl benzene sulfonamide, cyclohexyl benzene sulfonamide, 2-ethylhexyl benzene sulfonamide, and N-octyl benzene sulfonamide, which is preferred.

In the polyether aromatic sulfonamide of (ii), A is an aromatic group containing from 6 to 39 carbon atoms. Examples include phenyl, tolyl, hexadecyloxy benzene, and naphthyl groups. Phenyl groups are preferred. When Q is monovalent, z is equal to 1; when Q is trivalent, z is equal to 3. When R is an alkyl group, it is preferably a methyl group. When L is an alkyl group, it may be linear or branched, cyclic, or substituted. When L is an alkyl group, it is preferably a methyl group. The polyether aromatic sulfonamide of (ii) may also be a mixture of polyether aromatic sulfonamides having various structures selected from among those indicated above.

In a particular embodiment of the invention, the polyether aromatic sulfonamide of (ii) has the following structure:

wherein A is a phenyl group.

The polyether aromatic sulfonamide of (ii) is generally prepared by reacting together an aromatic sulfonic acid or sulfonyl halide such as benzene sulfonic acid or benzene sulfonyl chloride with an amine functional polyether having the structure:

wherein Q, R, y, and z are as defined above.

Preferred amine functional polyethers used to prepare the polyether aromatic sulfonamide of (ii) are sold under the name JEFFAMINE® by Huntsman Chemicals. Particularly preferred amine functional polyethers include JEFFAMINE® D-400. A particularly preferred polyether aromatic sulfonamide is a reaction product of benzene sulfonyl chloride and JEFFAMINE® D-400 in a 2:1 mole ratio.

The weight ratio of the alkyl aromatic sulfonamide of (i) to the polyether aromatic sulfonamide of (ii) in the composition of the present invention may range between 1:99 and 99:1. The weight ratio of (i) to (ii) is preferably 1:1.

The alkyl aromatic sulfonamide of (i) or the composition of the present invention comprising the mixture of sulfonamides (i) and (ii) may be used as a plasticizer in a resinous composition. Such resinous compositions may include, inter alia, film-forming compositions such as adhesives, protective coatings and laminating substrates. Therefore, in accordance with the present invention, there is further provided a resinous composition comprising:

a) a film-forming material; and
b) a plasticizer for the film-forming material; the plasticizer comprising the alkyl aromatic sulfonamide of (i) or mixtures of sulfonamides (i) and (ii) as described above. Preferred compositions are adhesive compositions. Such a composition is non-fogging and is suitable for use in a vacuum forming adhesion process. The plasticizer preferably comprises a mixture of sulfonamides (i) and (ii).

When the resinous composition of the present invention is an adhesive, the film-forming material used in the adhesive composition may comprise any resinous film-forming material useful in vacuum forming laminating adhesives as known to those skilled in the art. A particularly preferred film-forming material is an ionic water-dispersed polyurethane. The polyurethane can be prepared by methods known in the art, and is typically prepared by reacting excess polyisocyanate with a polyhydroxyl compound to form an isocyanate functional urethane prepolymer.

The polyisocyanates used to prepare the urethane prepolymer can be aliphatic or aromatic isocyanates. Representative examples are the aliphatic isocyanates such as trimethylene, tetramethylene, pentamethylene, hexamethylene, 1,2-propylene, 1,2-butylene, 2,3-butylene, and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-dimethyldiphenyl methane-2,2',5,5'-tetraisocyanate; the polymerized polyisocyanates such as tolylene diisocyanate dimers and trimers, and the like.

Polyhydroxyl compounds useful for reacting with the polyisocyanates to prepare the urethane prepolymers are typically hydroxy terminated polyethers or polyesters. The polyethers are typically poly(oxyalkylene) derivatives of polyhydric alcohols, such as glycerol, trimethylolpropane, 1,2,6-hexanetriol, sorbitol, mannitol, pentaerythritol or sucrose. Suitable polyesters are typically prepared from reaction of a carboxylic acid and a polyol, for example, reaction between adipic acid or phthalic acid and ethylene glycol, propylene glycol, 1,3-butylene glycol, 1,4-butylene glycol, diethylene glycol, 1,2,6-hexanetriol, trimethylolpropane, or trimethylolethane.

The urethane prepolymer prepared by reacting a polyisocyanate with a polyhydroxyl compound may contain cationic groups to make the polymer water dispersible. Polymers containing suitable salt precursors can be converted to the cationic salts by adding a quaternizing or neutralizing agent to the polymer. In the present invention, compounds containing amine groups serve both to introduce salt forming groups and to chain extend the urethane prepolymer to form a polyurethane resin containing a wide range of molecular weights.

For the purpose of chain extending the urethane prepolymers, polyamines having at least two primary amine groups, preferably at least three amine groups, are reacted with the isocyanate groups of the urethane prepolymer. Alkylene polyamines may be used, but particularly preferred are the polyoxyalkylene triamines sold under the name JEFFAMINE® by Huntsman Chemicals.

Polyamine ketimines that may be used together with the polyamines during the chain extension step are derived from the reaction of a polyamine with a ketone. Preferred polyamines for making the ketimines are alkylene polyamines and the substituted alkylene polyamines. Especially preferred polyamines are selected from those having the following formula:

where R is a difunctional aliphatic group containing from 2 to about 48 carbon atoms. Each R may represent the same or different radicals in any one polyamine compound. Inert or non-interfering groups may be present on the group R. Particularly preferred are polyamines in which R is an aliphatic hydrocarbon group. It is still more preferred that R is an alkylene group of 2 to 6 carbon atoms. Typical examples of preferred polyamines for making the ketimines include diethylene triamine and the higher homologs of polyethylene polyamine, as well as the corresponding propylene and butylene polyamines. Other amines which may be employed include primary-secondary amines such as N-aminoethyl piperazines or amines corresponding to the formula:

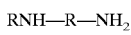

These polyamines are converted to ketimines by reaction with ketones having alkyl groups, preferably short chain alkyl groups (1 to 4 carbon atoms) that are substantially inert to the ketimine formation reaction. It is often preferred to use a ketone which boils below or near the boiling point of water or which readily distills with water. Preferred examples include acetone, methyl ethyl ketone, diethyl ketone, methyl propyl ketone, methyl isopropyl ketone, methyl n-butyl ketone, methyl isobutyl ketone, ethyl isopropyl ketone, cyclohexanone, cyclopentanone, acetophenone, and the like. Especially preferred are acetone, methyl ethyl ketone and methyl isobutyl ketone.

The ketones react with the primary amine groups of the polyamines (m-$NH_2$) to form a ketimine and water as a byproduct. When the polyamine includes two primary amine groups, each polyamine may react with two ketones to form a diketimine.

When the ketimines are included in the chain extending step, the secondary amine groups in the ketimines are reacted with a portion of the isocyanate groups contained in the urethane pre-polymers, thereby partially capping chain growth. Simultaneously, chain growth progresses by reaction of other isocyanate groups with the polyamine chain extending agent. The resulting chain-extended polyurethane has a combination of a substantial portion of relatively high molecular weight polymers and a substantial portion of relatively low molecular weight polymers. Thus, the polyurethane typically exhibits a high polydispersity index (at least 20, more often at least 25) that has been found advantageous for use in adhesive compositions. On the basis of equivalents of isocyanate-reactive groups, the ratio of polyamine to ketimine used in the chain extending step may range from 1:1 to 4:1, preferably 1.1:1 to 3:1. In specific preferred embodiments, a ratio of 2:1 has been found to be satisfactory. Substantially, all of the isocyanate groups are reacted during the chain extension step.

Polydispersity index is the number derived from dividing the weight average molecular weight by the number average molecular weight. Relatively low molecular weights may be considered those in the 3,000 to 10,000 range. Some molecules with molecular weights below 3,000 may be present in the polyurethane of the present invention, but their amounts are not significant, nor is their presence believed to be useful. Relatively high molecular weights may be considered to be those greater than 30,000 and particularly those greater than 100,000. The polyurethanes of the present invention have a substantial content of polymers having molecular weights greater than 30,000 and greater than 100,000. Expressed differently, the polyurethanes used in the film-forming material in the adhesive composition of the present invention comprise at least 10 percent (preferably at least 15 percent) polymers having molecular weights (weight basis) greater than 100,000 and at least 10 percent (preferably at least 15 percent) polymers having molecular weights (weight basis) less than 10,000. The high molecular weight portion provides temperature resistance to the polymer, and the low molecular weight portion provides bonding strength to the polymer.

It is significant that the synthesis of the polyurethane through the chain extension step is carried out in organic solvent medium, in which the imine groups of the ketimines are stable. Following the chain extension step, water is introduced into the system, whereby the imine groups hydrolyze and are converted to cationic salt groups that aid in dispersing the polyurethane in water. Thus, the ketimines in effect provide blocked amine groups during chain extension, thereby partially capping molecular weight growth as well as providing amine groups for the subsequent aqueous dispersion step.

The film-forming material in the adhesive composition of the present invention may further comprise a carbodiimide, a wetting agent that provides better coverage of the composition on a substrate. It is also believed to contribute to adhesion and thermal stability of the compositions. As used herein, the term carbodiimide refers to carbodiimide and substituted carbodiimides. A commercially available multifunctional carbodiimide that has been found useful is available from Union Carbide under the name UCARLINK XL 29SE. Other analogous materials include hydrogen cyanamide, dicyandiamide. Typically, when present, the carbodiimide is in the composition in amounts up to 10 weight percent, more preferably between 1 weight percent and 8 weight percent, and most preferably between about 2 weight percent and about 5 weight percent based on the total weight of resin solids in the adhesive composition.

The film-forming material in the adhesive composition of the present invention may optionally further comprise an aziridine compound, although it is not required for the desired performance properties. The aziridine compound primarily serves as a curing agent. In some formulations, it is also believed to improve heat resistance under some circumstances. As used herein, the term aziridine refers to any alkyleneimine and includes any compound based on the following structure:

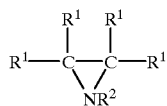

where $R^1$ is hydrogen, an alkyl radical having 1 to 3 carbon atoms, phenyl or combinations thereof and $R^2$ is hydrogen or an alkylene radical having 1 to 4 carbon atoms. Such aziridines include ethyleneimine, ethyl ethyleneimine and propyleneimine. The aziridine compound may also include polyfunctional aziridines. Particularly useful polyfunctional aziridines include trimethylolpropane-tris-(β-(N-aziridinyl) propionate) and pentaerythritol-tris-(β-(N-aziridinyl) propionate), available commercially from Hoechst Celanese, North Carolina, as XAMA-2 and XAMA-7, respectively. When aziridine is used, it is typically present in amounts up to 10 weight percent. Preferably, it is preferably included in amounts between 0.5 weight percent and 6 weight percent, and most typically between 1 weight percent and 3 weight percent based on total weight of resin solids in the adhesive composition.

The film-forming material (comprising the resin and any optional components such as aziridine and carbodiimide) is typically present in the adhesive composition of the present invention in amounts of between about 67 weight percent and about 99 weight percent, more preferably between about 75 weight percent and about 95 weight percent, and most preferably between about 80 weight percent and about 90 weight percent based on total weight of resin solids in the adhesive composition.

The plasticizer is typically present in the resinous composition of the present invention in an amount between about 1 weight percent and about 33 weight percent, more preferably between about 5 weight percent and about 25 weight percent, and most preferably between about 10 weight percent and about 20 weight percent based on total weight of resin solids in the adhesive composition. When the plasticizer is a mixture of the alkyl aromatic sulfonamide of (i) and the polyether aromatic sulfonamide of (ii), the weight ratio of (i) to (ii) is as above.

Typically, the adhesive compositions include water in an amount of between about 25 weight percent and about 75 weight percent, more preferably between about 40 weight percent and about 60 weight percent, most preferably between about 45 weight percent and about 53 weight percent based on the total weight of the composition.

The adhesive compositions of the present invention are stable prior to use. In particular, they are sufficiently stable to be useful as a single-component or "one package" adhesive in which all of the components are combined substantially prior to application without gelation of the composition and without unacceptable increases in viscosity before use. Once a composition gels, it is no longer possible to use it as an adhesive. If the viscosity of a composition increases to the point of being difficult to spray, but the composition is not gelled, additional solvent can be added to reduce viscosity to acceptable levels. Stability can be measured as an increase in viscosity over time at a given temperature. Various standard tests for measuring viscosity can be used. For example, a Brookfield viscometer measures the resistance encountered by a spindle being rotated through a container of material being evaluated.

The stability of a composition for use as a single-component composition can be evaluated by comparison of the viscosity of a fresh composition against the same composition after a given time at a given temperature. The composition of the present invention is formulated such that with an initial viscosity of about 1000–3000 centipoise (cps), after about 30 days, more preferably after about 60 days, and most preferably after about 90 days, at ambient temperature the composition has less than about a 50% gain in viscosity, more preferably less than about a 35% gain and most preferably less than about a 25% gain, the viscosity being measured with a Brookfield viscometer with a number 5 spindle. Ambient temperature is considered to be less than about 28° C. and more typically at about 25° C. It should be noted that stability of the present composition is determined at ambient temperatures and that, at elevated temperatures, it may not achieve high stability characteristics.

Although the resinous composition of the present invention is preferably adapted for adhering thermoplastic material to structural parts in automobiles, the adhesive compositions are useful in applying thermoplastic material to virtually any structural or decorative substrate. Typically, the substrate can be acrylonitrile-butadiene-styrene terpolymers (ABS), high impact polystyrene (HIPS), styrene-acrylonitrile copolymers (SAN), polyvinyl chloride (PVC or "vinyl"), polycarbonate (PC), high density polyethylene (HDPE), polyphenylene oxide (PPO) and fiberboard.

Some of these substrates, PVC in particular, may contain a plasticizer. Conventional plasticizers used in these substrates may contribute to fogging; the plasticizer of the present invention can be used in the substrate compositions for non-fogging properties as desired in automobile industries.

Application of the adhesive can be achieved in any manner known to those skilled in the art, and includes, for example, dipping, rolling, brushing, and spraying the adhesive onto the substrate. The adhesive is typically applied at film thicknesses of between about 1 mil and about 15 mils (25 to 375 microns), and more typically between about 3 mils and about 7 mils (75 to 175 microns). The composition is then dried on the substrate. Drying can be achieved by allowing the coated substrate to air dry at room temperature or by actively drying the composition with elevated temperatures. Depending on the temperature, humidity, and film thickness, drying of the composition on the substrate can take from several minutes to one hour or more. For example, a film at a thickness of about 5 mils (125 microns) can be dried in a 70° C. oven in about between 3 to 5 minutes.

After drying the composition or during the drying of the composition, the flexible material to be laminated to the substrate is heated to soften the material. Typically, the material is heated to a temperature of between about 43° C. and about 82° C. The heated material is then contacted to the dried composition. Most typically, the material is contacted by draping the heated flexible material onto the substrate.

A vacuum is then applied to the flexible material over the substrate to draw the material into all recessed areas of the substrate. Typically, the vacuum is drawn for at least about 10 seconds. In the case of substrates which are not porous, holes are made in the substrate so that a vacuum can pull the flexible material onto the substrate. In the case of porous materials, such as some fiberboard, a vacuum can be achieved directly through the substrate without placing holes in the substrate.

Subsequent to application of a vacuum, the adhesive compositions disclosed here cure at room temperature in about 8–16 hours. Cure can be accelerated by heating the laminated substrate.

The invention will be further described by reference to the following examples. Unless otherwise indicated, all parts are by weight.

EXAMPLE A

To a reaction flask equipped with stirrer, temperature probe and reflux condenser was added JEFFAMINE D-400* (102.5 g), n-octyl amine (103.5 g), deionized water (401.1 g) and potassium carbonate (94.9 g). To the resulting mixture, benzene sulfonyl chloride (231.9 g) was added over 2 hours. After the addition was complete the reaction was warmed to 40° C. for 2 hours. The reaction was followed by pH measurement of the aqueous layer. When the pH reached 4.5, 25 g of potassium carbonate was added and the reaction warmed to 65° C. The temperature was maintained for 3 hours and the reaction was cooled without agitation. The aqueous layer was removed and 400 g of toluene was added. The reaction was dried by azeotropic distillation, filtered and residual toluene stripped off under vacuum.

*JEFFAMINE D-400 is a polyoxypropylene diamine commercially available from Huntsman Chemical Corp.

EXAMPLES 1 TO 4

The following examples illustrate the preparation of adhesive compositions. Example 1 is a preferred composition prepared in accordance with the invention, wherein the plasticizer comprises a mixture of an alkyl aromatic sulfonamide containing from 12 to 40 carbon atoms total and 6 to 10 carbon atoms in an alkyl group, and a polyether aromatic sulfonamide. The compositions of Examples 2 to 4 contain only alkyl aromatic sulfonamides as in component (i) of the composition of the present invention. Four vacuum forming adhesive formulations were prepared as shown in the following table:

TABLE 1

|  | Example 1 | Example 2 | Example 3 | Example 4 |
|---|---|---|---|---|
| Polyurethane[1] | 53.28 | 49.91 | 51.53 | 51.61 |
| Ethylene/Vinyl Acetate[2] | 32.90 | 31.29 | 32.23 | 32.36 |
| JEFFAMINE D400 BSA[3] | 4.62 | 0 | 0 | 0 |
| Octyl benzene sulfonamide | 4.62 | 10.5 | 6.26 | 0 |
| Hexyl benzene sulfonamide | 0 | 0 | 6.26 | 12.29 |
| Aziridine[4] | 0.56 | 0.56 | 0.55 | 0.55 |
| Carbodiimide[5] | 3.89 | 3.02 | 3.03 | 3.04 |
| M-Pyrol | 0 | 4.5 | 0 | 0 |
| Blue Tint | 0.14 | 0.22 | 0.14 | 0.14 |
| Deionized Water | 2 | 0 | 0 | 2 |

[1] Prepared generally in accordance with Example 1 of U.S. Pat. 5,652,299, with an equivalent ratio of isophorone diisocyanate to toluene diisocyanate of 11.4 to 1.0.
[2] Ethylene/Vinyl Acetate - AIRFLEX 460 ethylene/vinyl acetate copolymer available from Air Products and Chemicals, Inc.
[3] JEFFAMINE D400 BSA - JEFFAMINE D400 benzene sulfonamide.
[4] Aziridine - XAMA-2, trimethylolpropane-tris-(β-(N-aziridinyl) propionate), available from Hoechst Celanese.
[5] Carbodiimide - UCARLINK XL-29SE carbodiimide crosslinker available from Union Carbide.

These formulations, along with Trimbond T7944, a commercially available vacuum forming adhesive from PPG Industries, Inc., were tested in accordance with the test procedures set forth below. Trimbond T7944 contains butyl benzene sulfonamide as plasticizer which would fog when tested according to the procedure described below.

SURLYN Bonding Test Procedure

Plaques of DYLARK resin (3 inches (7.62 cm) by 4 inches (10.16 cm)) were cleaned with isopropyl alcohol and coated with the adhesives of examples 1 to 4 and the additional comparative example (Trimbond T7944) by spraying to a coating weight (dry) of 0.2 to 0.3 gram per 12 square inches (30.48 square cm). The adhesive coated plaques were baked for six minutes at 158° F. (70° C.), then cooled. A 5 mil (125 microns) thick SURLYN resin film was bonded onto each adhesive coated plaque surface with 5 inches of vacuum in a vacuum forming device (Formech 450 Vacuum Former). The film on each plaque was cut into two 1-inch (2.54 cm) wide strips the length of the panel. One strip, after aging for 1 hour at room temperature, was pulled at 180° with a force gauge (Omega Model #DFG 51-50 force gauge) at a rate of 90 inches (228.6 cm) per minute. The second strip was pulled in a like manner after aging for 24 hours. Results were reported for each test in maximum pounds of force used.

Cotton Duck Bonding Test Procedure

DYLARK resin panels (2.75 inches by 1.0 inch, 6.98 cm×2.54 cm) were cleaned with isopropyl alcohol. Thirteen pound cotton duck cloth specimens (4.0 inches by 1.0 inch, 10.16 cm×2.54 cm) were cut. Test specimens were prepared by spraying adhesive on both the plastic panels and the duck cloth, and then the cloth was bonded to the panel with a 5 pound metal roller by rolling 10 passes. The sandwich was baked at 158° F. (70° C.) for 7 minutes and then aged for 72 hours at room temperature. The specimen was placed in a test frame and a weight is attached to the cloth so that force was applied at an angle of about 60 degrees. The frame with the specimen and weight in place was heated in an oven at 180° F. (82.2° C.) for 1 hour. The temperature was raised to 200° F. (93.3° C.) and held for an additional hour. Incremental temperature increases were continued until the temperature reaches 240° F. (115.6° C.). At each interval, the point of separation of the cotton duck cloth from the substrate was marked. Failure was noted when the cloth pulled off the plastic or the plastic distorted enough from the heat and forced to release from the frame. Results were reported in terms of percentage of total length moved at each temperature interval.

ABS-Bilaminate Test Procedure

Test plaques (4 inches by 6 inches, 10.16 cm×15.24 cm) of acrylonitrile-butadiene-styrene resin (ABS) were coated with adhesive by draw down with a 6 mil draw bar. Plaques were dehydration baked for 5 minutes at 158° F. (70° C.) and cooled. Bilaminate strips (foam-backed vinyl, comprised of a backing layer, textured layer, and cover sheet) were preheated at 130° F. (54.4° C.) for 10 to 20 minutes and the ABS plaques were placed in the oven for 4 minutes. The vinyl strips were bonded to the ABS plaque by covering each plaque with bilaminate, placing the sandwich in a Carver press (Carver Press Model 2697), and bonding with 14.6 pounds per square search for 11 seconds. Samples were cooled for 1 hour and then tested for 180° peel strength using the digital force gauge (Omega DFG 51-50 Digital Force Gauge). After 24 hours the peel strength test was repeated. Results were reported on 1 hour and 24 hour maximum peel resistance in pounds/linear inch of sample width. After 72 hours the plaque was placed in a test frame for hanging weight peel resistance at 190° F. (87.8° C.) as a function of time. A 150 gram weight was clipped onto the bilaminate sample and permitted to hang at an angle slightly offset from the plane of the plaque. The location of separation between the substrate and the bilaminate layer was marked and the sample placed into an oven at 190° F. (87.8° C.). The location of the separation was marked after one hour and after five hours. For the 19° F. (87.8° C.) hanging weight test, either the time to failure (if less than 5 hours) or the distances moved in one hour and five hours were reported.

Fog Test Procedure

The test was run according to SAE J1756 protocol with Photometric method using a fog test equipment from Hart Scientific. The gloss reading requirement by automotive manufacturers range from 60% to 70% minimum. Slight uniform fog on the glass test plates is acceptable but there should not be any particles, oily droplets and disturbance.

TABLE 2

| EXAMPLE | Trimbond T7944 | 1 | 2 | 3 | 4 |
|---|---|---|---|---|---|
| INITIAL RESULTS | | | | | |
| SURLYN substrate bonding Peel Value | | | | | |

TABLE 2-continued

| EXAMPLE | Trimbond T7944 | 1 | 2 | 3 | 4 |
|---|---|---|---|---|---|
| (lb./inch) | | | | | |
| 1 hr. | 4.7 | 3.8 | 4.2 | 4.7 | 5.6 |
| 24 hr. | 3.1 | 4.0 | 5.3 | 6.7 | 4.9 |
| Cotton duck - DYLARK substrate bonding | | | | | |
| % movement @ 180 F. | 2% | 13% | Failed (30 min.) | 10% | 29% |
| % movement @ 200 F. | 3% | 20% | | 15% | 45% |
| % movement @ 220 F. | 5% | 25% | | 19% | 55% |
| % movement @ 240 F. | 7% | 28% | | 19% | 62% |
| ABS substrate - bilaminate bonding Peel Values (lb./inch) | | | | | |
| 1 hr. | 7 | 9 | 8 | 7 | 8 |
| 24 hr. | 8 | 8 | 10 | 11 | 10 |
| 1 hr. @ 190 F. movement | 3 mm | 1 mm | 4 mm | 17 mm | 3 mm |
| 5 hr. @ 190 F. movement | 9 mm | 3 mm | 8 mm | 38 mm | 25 mm |
| 24 HOUR @ 110 F. TEST RESULTS | | | | | |
| SURLYN substrate bonding Peel Value (lb./inch) | | | | | |
| 1 hr. | 6.9 | 4.1 | 4.4 | 3.8 | 6.2 |
| 24 hr. | 6.0 | 6.3 | 4.9 | 3.3 | 6.2 |
| Cotton duck - DYLARK substrate bonding | | | | | |
| % movement @ 180 F. | 4% | 7% | Failed (55 min.) | Failed (25 min.) | Failed (42 min.) |
| % movement @ 200 F. | 5% | 13% | | | |
| % movement @ 220 F. | 5% | 15% | | | |
| % movement @ 240 F. | 9% | 16% | | | |
| APS substrate - bilaminate bonding Peel Values (lb./inch) | | | | | |
| 1 hr. | 6 | 11 | 8 | 7 | 7 |
| 24 hr. | 10 | 10 | 7 | 10 | 10 |
| 1 hr. @ 190 F. movement | 11 mm | 5 mm | 6 mm | Failed (42 min.) | 4 mm |
| 5 hr. @ 190 F. movement | 17 mm | 8 mm | 23 mm | | 27 mm |
| FOG TEST RESULTS | | | | | |
| Gloss Value | 96% | 98.8% | 99.4% | 97.2% | 97.7% |
| Plate Appearance | oily surface small particles | slight fog | uniform fog | without particles or oily droplets | |

As can be seen from the results shown above, all formulations had acceptable gloss value in the fog test. However, Trimbond T7944 generated oily droplets on the test plates and thus would not pass the test. The compositions of Examples 1 through 4 were all non-fogging; moreover, the composition of Example 1 which is a preferred embodiment of the present invention, containing a mixture of an alkyl aromatic sulfonamide and a polyether aromatic sulfonamide as plasticizer, passed all the required adhesive performance tests.

We claim:

1. A composition of matter comprising a mixture of:
   (i) at least one alkyl aromatic sulfonamide containing from 12 to 40 carbon atoms total and at least six carbon atoms in the alkyl group; and
   (ii) at least one polyether aromatic sulfonamide different from (i) and having the following structure:

$$Q-[(OCH(R)CH(R))_y-NH-SO_2-A]_z$$

wherin Q is selected from the following structures:

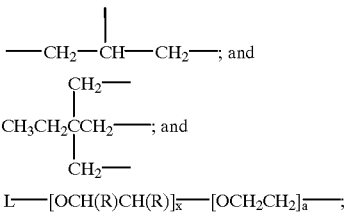

and wherein A is an aromatic group containing from 6 to 39 carbon atoms; L is an alkyl group containing from 1 to 20 carbon atoms or $A-SO_2-NHCH(CH_3)CH_2-$; R is independently hydrogen or linear or branched alkyl groups having from 1 to 4 carbon atoms; x ranges from 0 to 40; y ranges from 2 to 40; z ranges from 1 to 3; and a ranges from 0 to 40.

2. The composition of claim 1, wherein the alkyl aromatic sulfonamide of (i) is N-octyl benzene sulfonamide.

3. The composition of claim 1, wherein the polyether aromatic sulfonamide of (ii) has the structure:

$$A-SO_2-NHCH(CH_3)CH_2-(OCH_2CH(CH_3))_{5-6}-NH-SO_2-A.$$

4. The composition of claim 3, wherein A is a phenyl group.

5. The composition of claim 1, wherein the weight ratio of (i) to (ii) is 1:99 to 99:1.

6. A resinous composition comprising:
   a) a film-forming material; and
   b) a plasticizer for the film-forming material, wherein the plasticizer comprises:
      (i) at least one alkyl aromatic sulfonamide containing from 12 to 40 carbon atoms total and at least six carbon atoms in the alkyl group;
   or a mixture of the alkyl aromatic sulfonamide of (i) with:
      (ii) at least one polyether aromatic sulfonamide different from (i) and having the following structure:

$$Q-[(OCH(R)CH(R))_y-NH-SO_2-A]_3$$

wherein Q is selected from the following structures:

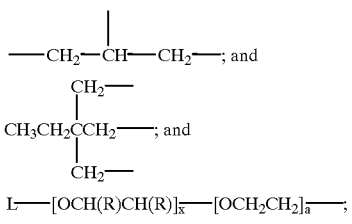

L—[OCH(R)CH(R)]$_x$—[OCH$_2$CH$_2$]$_a$—;

and wherein A is an aromatic group containing from 6 to 39 carbon atoms; L is an alkyl group containing from 1 to 20 carbon atoms or A—SO$_2$—NHCH(CH$_3$)CH$_2$—; R is independently hydrogen or linear or branched alkyl groups having from 1 to 4 carbon atoms; x ranges from 0 to 40; y ranges from 2 to 40; z ranges from 1 to 3; and a ranges from 0 to 40.

7. The composition of claim 6, wherein the composition is an adhesive composition.

8. The composition of claim 7, wherein the composition is waterborne.

9. The composition of claim 7, wherein the film-forming material comprises (1) an ionic water-dispersed polyurethane; and (2) a carbodiimide.

10. The composition of claim 7, wherein the film-forming material further comprises an aziridine curing agent.

11. The composition of claim 10, wherein the aziridine curing agent is trimethylolpropane-tris-(β-(N-aziridinyl)propionate).

12. The composition of claim 7, wherein the alkyl aromatic sulfonamide of (i) is N-octyl benzene sulfonamide.

13. The composition of claim 7, wherein the plasticizer is a mixture of (i) and (ii) and the polyether aromatic sulfonamide of (ii) has the structure

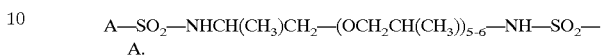

14. The composition of claim 13, wherein A is a phenyl group.

15. The composition of claim 7, wherein a) is present in an amount of 67 to 99 percent by weight, based on the total weight of resin solids in the composition.

16. The composition of claim 7, wherein b) is present in an amount of 1 to 33 percent by weight, based on the total weight of resin solids in the composition.

17. The composition of claim 7, wherein the plasticizer is a mixture of (i) and (ii) and the weight ratio of (i) to (ii) is 1:99 to 99:1.

* * * * *

UNITED STATES PATENT AND TRADEMARK OFFICE
CERTIFICATE OF CORRECTION

PATENT NO. : 6,194,498 B1
DATED : February 27, 2001
INVENTOR(S) : Lawrence G. Anderson; Tien-Chieh; Masayuki Nakajima; Umesh Chandraprasad Desai It is certified that error appears in the above-identified patent and that said Letters Patent is hereby corrected as shown below:

<u>Column 12, claim 6 (ii),</u>
Line 66, subscript "3" should be subscript -- z --.

Signed and Sealed this

Eleventh Day of December, 2001

*Attest:*

NICHOLAS P. GODICI
*Attesting Officer*         *Acting Director of the United States Patent and Trademark Office*